United States Patent
Jia

(10) Patent No.: US 8,934,539 B2
(45) Date of Patent: Jan. 13, 2015

(54) VECTOR PROCESSOR ACCELERATION FOR MEDIA QUANTIZATION

(75) Inventor: Wei Jia, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1293 days.

(21) Appl. No.: 11/999,059

(22) Filed: Dec. 3, 2007

(65) Prior Publication Data

US 2009/0141797 A1 Jun. 4, 2009

(51) Int. Cl.
| | |
|---|---|
| *H04N 7/12* | (2006.01) |
| *H04N 11/02* | (2006.01) |
| *H04N 11/04* | (2006.01) |
| *H04N 19/60* | (2014.01) |
| *H04N 19/18* | (2014.01) |
| *H04N 19/61* | (2014.01) |
| *H04N 19/436* | (2014.01) |
| *H04N 19/124* | (2014.01) |

(52) U.S. Cl.
CPC ... *H04N 19/00775* (2013.01); *H04N 19/00296* (2013.01); *H04N 19/00781* (2013.01); *H04N 19/00521* (2013.01); *H04N 19/0009* (2013.01)
USPC ............ 375/240.03; 375/240.02; 375/240.18; 375/240.24

(58) Field of Classification Search
None
See application file for complete search history.

(56) References Cited

U.S. PATENT DOCUMENTS

| | | |
|---|---|---|
| 4,665,556 A | 5/1987 | Fukushima et al. |
| 5,163,136 A | 11/1992 | Richmond |
| 5,189,671 A | 2/1993 | Cheng |
| 5,420,872 A | 5/1995 | Hyodo et al. |
| 5,426,731 A | 6/1995 | Masukane et al. |
| 5,585,931 A | 12/1996 | Juri et al. |
| 5,739,863 A | 4/1998 | Ohtsuki |
| 5,754,457 A | 5/1998 | Eitan et al. |
| 5,774,206 A | 6/1998 | Wasserman et al. |
| 5,781,239 A | 7/1998 | Mattela et al. |
| 5,796,743 A | 8/1998 | Bunting et al. |
| 5,818,529 A | 10/1998 | Asamura et al. |

(Continued)

FOREIGN PATENT DOCUMENTS

| | | |
|---|---|---|
| CN | 101017574 | 8/2007 |
| JP | 06276394 | 9/1994 |

(Continued)

OTHER PUBLICATIONS

English Translation of Office Action for Chinese Patent Application No. 200810212373.X, Entitled: Decoding Variable Length Codes in JPEG Applications.

*Primary Examiner* — Hassan Phillips
*Assistant Examiner* — Lonnie Sweet

(57) ABSTRACT

A method and system for vector processor quantization acceleration for an encoding process. The encoding process is implemented using the hardware of a video processor. The method includes computing coefficients for a DCT (discrete cosine transform) encoding operation and determining a quantization step for use with a quantization operation for each of the coefficients. A vector processor is then used for quantization acceleration. Out of a range of possible quantized output values, the vector processor computes a set of quantized output values from the coefficients. The vector processor is configured to evaluate each of the quantized output values of the set in parallel. For the range of possible quantized output values that are not computed using the vector processor, the quantized output values are computed by using a multiplication logic path.

17 Claims, 4 Drawing Sheets

(56) References Cited

U.S. PATENT DOCUMENTS

| | | |
|---|---|---|
| 5,821,886 A | 10/1998 | Son |
| 5,850,482 A * | 12/1998 | Meany et al. ............... 382/232 |
| 5,946,037 A | 8/1999 | Ahnn |
| 5,969,750 A | 10/1999 | Hsieh et al. |
| 5,990,812 A | 11/1999 | Bakhmutsky |
| 6,008,745 A | 12/1999 | Zandi et al. |
| 6,023,088 A | 2/2000 | Son |
| 6,026,506 A | 2/2000 | Anderson et al. |
| 6,038,580 A | 3/2000 | Yeh |
| 6,041,403 A | 3/2000 | Parker et al. |
| 6,041,431 A | 3/2000 | Goldstein |
| 6,047,253 A | 4/2000 | Nishiguchi et al. |
| 6,047,357 A | 4/2000 | Bannon et al. |
| 6,144,322 A | 11/2000 | Sato |
| 6,157,741 A | 12/2000 | Abe et al. |
| 6,161,531 A | 12/2000 | Hamburg et al. |
| 6,246,347 B1 | 6/2001 | Bakhmutsky |
| 6,298,370 B1 | 10/2001 | Tang et al. |
| 6,317,063 B1 | 11/2001 | Matsubara |
| 6,339,658 B1 | 1/2002 | Moccagatta et al. |
| 6,404,928 B1 * | 6/2002 | Shaw et al. ............... 382/232 |
| 6,441,757 B1 | 8/2002 | Hirano |
| 6,462,744 B1 | 10/2002 | Mochida et al. |
| 6,480,489 B1 | 11/2002 | Muller et al. |
| 6,493,872 B1 | 12/2002 | Rangan et al. |
| 6,507,614 B1 | 1/2003 | Li |
| 6,529,631 B1 * | 3/2003 | Peterson et al. ............... 382/232 |
| 6,543,023 B2 | 4/2003 | Bessios |
| 6,552,673 B2 | 4/2003 | Webb |
| 6,556,252 B1 | 4/2003 | Kim |
| 6,563,440 B1 | 5/2003 | Kangas |
| 6,563,441 B1 | 5/2003 | Gold |
| 6,573,946 B1 | 6/2003 | Gryskiewicz |
| 6,577,681 B1 | 6/2003 | Kimura |
| 6,587,057 B2 | 7/2003 | Scheuermann |
| 6,654,539 B1 | 11/2003 | Duruoz et al. |
| 6,675,282 B2 | 1/2004 | Hum et al. |
| 6,696,992 B1 | 2/2004 | Chu |
| 6,718,507 B1 | 4/2004 | Johnston et al. |
| 6,738,522 B1 | 5/2004 | Hsu et al. |
| 6,754,687 B1 | 6/2004 | Kurak, Jr. et al. |
| 6,795,503 B2 | 9/2004 | Nakao et al. |
| 6,839,624 B1 | 1/2005 | Beesley et al. |
| 6,891,976 B2 | 5/2005 | Zheltov et al. |
| 6,925,119 B2 * | 8/2005 | Bartolucci et al. ....... 375/240.03 |
| 6,981,073 B2 | 12/2005 | Wang et al. |
| 7,016,547 B1 | 3/2006 | Smirnov |
| 7,051,123 B1 | 5/2006 | Baker et al. |
| 7,068,407 B2 | 6/2006 | Sakai et al. |
| 7,068,919 B2 | 6/2006 | Ando et al. |
| 7,069,407 B1 | 6/2006 | Vasudevan et al. |
| 7,074,153 B2 | 7/2006 | Usoro et al. |
| 7,113,115 B2 | 9/2006 | Partiwala et al. |
| 7,113,546 B1 | 9/2006 | Kovacevic et al. |
| 7,119,813 B1 | 10/2006 | Hollis et al. |
| 7,129,862 B1 | 10/2006 | Shirdhonkar et al. |
| 7,132,963 B2 | 11/2006 | Pearlstein et al. |
| 7,158,539 B2 | 1/2007 | Zhang et al. |
| 7,209,636 B2 | 4/2007 | Imahashi et al. |
| 7,230,986 B2 | 6/2007 | Wise et al. |
| 7,248,740 B2 | 7/2007 | Sullivan |
| 7,286,543 B2 | 10/2007 | Bass et al. |
| 7,289,047 B2 | 10/2007 | Nagori |
| 7,324,026 B2 | 1/2008 | Puri et al. |
| 7,327,378 B2 | 2/2008 | Han et al. |
| 7,372,378 B2 | 5/2008 | Sriram |
| 7,372,379 B1 | 5/2008 | Jia et al. |
| 7,432,835 B2 | 10/2008 | Ohashi et al. |
| 7,439,883 B1 | 10/2008 | Moni et al. |
| 7,606,313 B2 | 10/2009 | Raman et al. |
| 7,613,605 B2 * | 11/2009 | Funakoshi ............... 704/219 |
| 7,627,042 B2 | 12/2009 | Raman et al. |
| 7,724,827 B2 | 5/2010 | Liang et al. |
| 7,765,320 B2 | 7/2010 | Vehse et al. |
| 7,812,927 B2 | 10/2010 | Kurosawa |
| 8,032,367 B2 | 10/2011 | Takamizawa |
| 8,687,875 B2 | 4/2014 | Jia |
| 8,725,504 B1 | 5/2014 | Jia |
| 8,731,051 B1 | 5/2014 | Chaurasia et al. |
| 2001/0010755 A1 | 8/2001 | Ando et al. |
| 2001/0026585 A1 | 10/2001 | Kumaki |
| 2002/0001411 A1 * | 1/2002 | Suzuki et al. ............... 382/238 |
| 2002/0094031 A1 | 7/2002 | Ngai et al. |
| 2002/0135683 A1 | 9/2002 | Tamama et al. |
| 2002/0143835 A1 | 10/2002 | Kechriotis |
| 2003/0043919 A1 | 3/2003 | Haddad |
| 2003/0067977 A1 | 4/2003 | Chu et al. |
| 2003/0120691 A1 | 6/2003 | Nakayama |
| 2003/0142105 A1 | 7/2003 | Lavelle et al. |
| 2003/0156652 A1 | 8/2003 | Wise et al. |
| 2003/0179706 A1 | 9/2003 | Goetzinger et al. |
| 2003/0191788 A1 | 10/2003 | Auyeung et al. |
| 2003/0196040 A1 | 10/2003 | Hosogi et al. |
| 2003/0221089 A1 | 11/2003 | Spracklen |
| 2004/0006581 A1 | 1/2004 | Nakayama |
| 2004/0028127 A1 * | 2/2004 | Subramaniyan ......... 375/240.01 |
| 2004/0028142 A1 | 2/2004 | Kim |
| 2004/0056787 A1 | 3/2004 | Bossen |
| 2004/0059770 A1 | 3/2004 | Bossen |
| 2004/0067043 A1 | 4/2004 | Duruoz et al. |
| 2004/0081245 A1 | 4/2004 | Deeley et al. |
| 2004/0096002 A1 | 5/2004 | Zdepski et al. |
| 2004/0130553 A1 | 7/2004 | Ushida et al. |
| 2004/0145677 A1 | 7/2004 | Raman et al. |
| 2005/0008331 A1 | 1/2005 | Nishimura et al. |
| 2005/0123274 A1 | 6/2005 | Crinon et al. |
| 2005/0182778 A1 | 8/2005 | Heuer et al. |
| 2005/0207497 A1 | 9/2005 | Rovati et al. |
| 2006/0013321 A1 | 1/2006 | Sekiguchi et al. |
| 2006/0083306 A1 | 4/2006 | Hsu |
| 2006/0176309 A1 * | 8/2006 | Gadre et al. ............... 345/501 |
| 2006/0177142 A1 | 8/2006 | Zhou |
| 2006/0227874 A1 | 10/2006 | Tongle et al. |
| 2006/0256120 A1 | 11/2006 | Ushida et al. |
| 2007/0006060 A1 | 1/2007 | Walker |
| 2007/0036225 A1 | 2/2007 | Srinivasan et al. |
| 2007/0263728 A1 * | 11/2007 | Yanagihara et al. ..... 375/240.24 |
| 2007/0288971 A1 | 12/2007 | Cragun et al. |
| 2007/0291858 A1 | 12/2007 | Hussain et al. |
| 2008/0069464 A1 * | 3/2008 | Nakayama ............... 382/244 |
| 2008/0162860 A1 | 7/2008 | Sabbatini et al. |
| 2008/0219575 A1 * | 9/2008 | Wittenstein ............... 382/238 |
| 2008/0285648 A1 * | 11/2008 | Plagne ............... 375/240.12 |
| 2008/0317138 A1 | 12/2008 | Jia |
| 2009/0083788 A1 | 3/2009 | Russell et al. |

FOREIGN PATENT DOCUMENTS

| | | |
|---|---|---|
| JP | 09261647 | 10/1997 |
| JP | 2000049621 | 2/2000 |
| KR | 1020030016859 | 3/2003 |
| WO | 0124425 | 4/2001 |

* cited by examiner

VECTOR PROCESSOR ACCELERATION FOR MEDIA QUANTIZATION

CROSS REFERENCE TO RELATED APPLICATION

This application is related to U.S. patent application "COMPARATOR BASED ACCELERATION FOR MEDIA QUANTIZATION" by Wei Jia, filed on Dec. 3, 2007, Ser. No. 11/999,154, which is incorporated herein in its entirety.

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

The computational resources of the GPU are increasingly being used to handle compute intensive tasks other than 3-D graphics processing. One such task is to use GPU resources to accelerate video processing operations, and one such video processing operation involves the acceleration of JPEG encoding.

As commonly used, JPEG (Joint Photographic Experts Group) refers to a standardized method for the compression of images. The JPEG standard specifies both the codec, which defines how an image is compressed into a stream of bytes and decompressed back into an image, and the file format used to contain that stream. The compression method implemented by the codec is usually lossy, meaning that some visual quality is lost in the process, although there are variations on the JPEG codec that can implement lossless compression.

It is important that the JPEG codec is efficiently executed in order to provide sufficient responsiveness and interactivity for a user. For example, in a real-time image compression application (e.g., web cam, digital camera, etc.) is important that sufficient processing power is provided to ensure smooth image output and good application responsiveness.

A problem exists in the fact that quantization is one of the key steps in typical JPEG codecs. For example, linear quantization, which is commonly used in JPEG codecs, involves the implementation of a division operation. Unfortunately, division operations are usually very expensive for most computing platforms. Because of this, typical prior art computer platforms for implementing real-time JPEG codec execution can be overpowered, in that they comprise an excessively large number of computer resources in order to deliver sufficient responsiveness, image quality, and interactivity, and thus consume too much power (e.g., which is harmful to handheld applications). Alternatively, other prior art computer platforms, to conserve power consumption, sacrifice responsiveness, image quality, or interactivity in order to achieve acceptable battery performance.

Thus, a need exists for a solution that can yield improved codec execution performance without sacrificing application responsiveness, image quality, or user interactivity.

SUMMARY OF THE INVENTION

Embodiments of the present invention provide a solution that can yield improved codec execution performance without sacrificing application responsiveness, image quality, or user interactivity.

In one embodiment, the present invention is implemented as a method for vector processor quantization acceleration for a media encoding process. The encoding process is implemented using the hardware of a video processor (e.g., within a GPU). The method includes computing coefficients for a DCT (discrete cosine transform) encoding operation and determining a quantization step for use with a quantization operation for each of the coefficients. A vector processor is then used for quantization acceleration. Out of a range of possible quantized output values, the vector processor computes a set of quantized output values from the coefficients. The vector processor is configured to evaluate each of the quantized output values of the set in parallel. For the range of possible quantized output values that are not computed using the vector processor, the quantized output values are computed by using a multiplication logic path.

In one embodiment, the vector processor comprises a plurality of comparators, where each of the comparators is configured to determine a respective one quantized output value of the set of output values. Each of the comparators operates in parallel to compute a resulting quantized output value from the coefficients. In one embodiment, the performance of the vector processor can be increased by including a larger number of comparators. The larger number of comparators increases the size of the set of quantized output values that can be computed in parallel.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
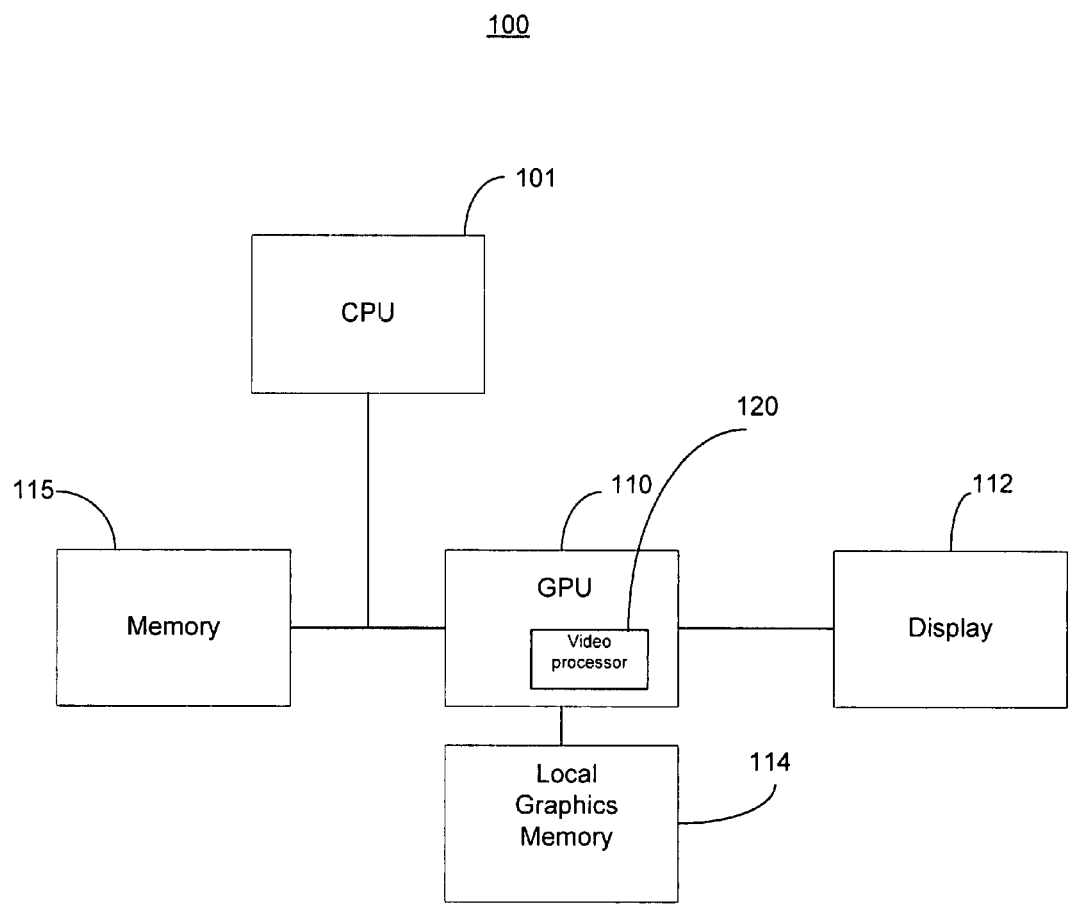
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot. etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

EMBODIMENTS OF THE INVENTION

Embodiments of the present invention provide a solution that can yield improved codec execution performance without sacrificing application responsiveness, image quality, or user interactivity. In one embodiment, the present invention is implemented as a method for comparator based quantization acceleration for an encoding process. The encoding process is implemented using the hardware of a video processor (e.g., processor 120) within a GPU (e.g., GPU 110). The method includes computing coefficients for a DCT encoding operation and determining a quantization step for use with a quantization operation for each of the coefficients. The method further includes determining each of the coefficients that are less than or equal to ½ of the quantization step. This determination is made by using a comparator that is configured in accordance with the quantization step. For the coefficients that are less than or equal to ½ of the quantization step, a quantized output value is transmitted for further processing. For the coefficients that are greater than ½ of the quantization step, the quantized output value is determined by executing multiplication logic to compute the quantized output value, and then transmitted for further processing. Embodiments of the present invention and their benefits are further described below.

Figure 2:
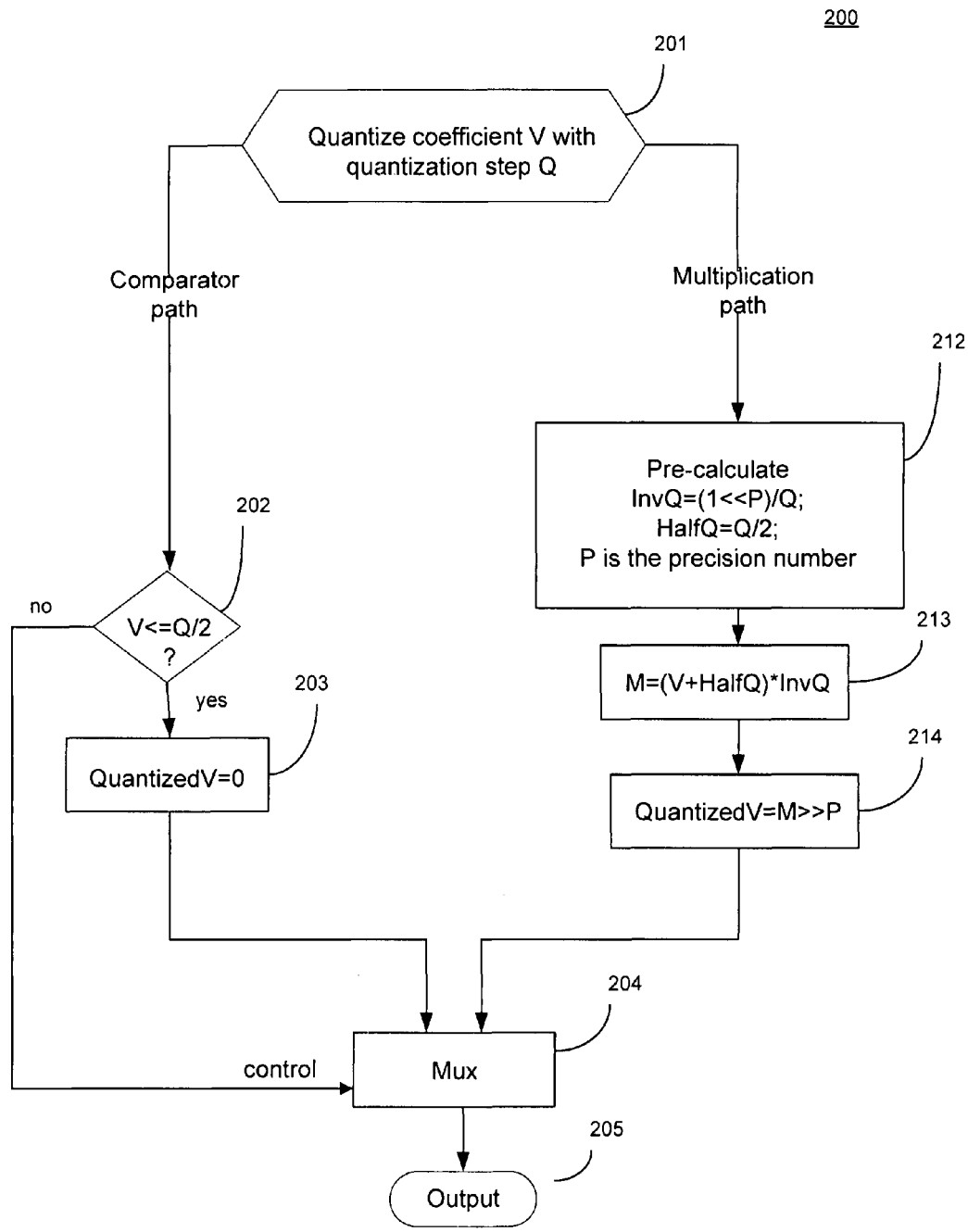
FIG. 2 shows a diagram of a flow chart of a comparator based quantization acceleration process 200 in accordance with one embodiment of the present invention.

FIG. 2 shows a diagram of a flow chart of a comparator based quantization acceleration process 200 in accordance with one embodiment of the present invention. As depicted in FIG. 2, process 200 shows the general operating steps of a comparator based quantization process that implements both a comparator path and a multiplication path as shown.

Process 200 shows the steps involved in executing DCT (discrete cosine transform) quantization. DCT quantization is one of the key steps involved in many different types of media codecs (e.g., JPEG, MPEG1/2/4, H.264, VC1, and the like). Each of these different media codecs can benefit greatly from the quantization acceleration provided by process 200. Even some nonlinear DCT quantization cases can benefit from process 200 (e.g., AAC, MP3, WMA, etc.).

In a conventional implementation, such as for example, JPEG encoding, the linear quantization involves the implementation of division operations. These division operations are very expensive for most computing platforms. For example, for a nonnegative DCT coefficient value V, quantizing the value V with a quantization step Q is defined by the following relationship:

$$\text{Quantized} V = [V/Q]$$

where V/Q is a floating point number division, and operator "[ ]" means to cast the floating number to nearest integer. In other words, if $((k*Q)+Q/2)<=V<(((k+1)*Q)+Q/2)$, then QuantizedV =k+1.

Since division is computationally expensive, to evaluate the above relationship, a typical conventional implementation uses a combination of multiplication and shifting for all coefficients of V instead. For example, such a scheme pre-calculates the inverse value (InvQ) of quantization step Q with certain number of bits of precision P. Then a multiplication of InvQ and coefficient (V) is applied. With an addition and shifting, final quantized value (QuantizedV) is derived. This calculation is applied to every coefficient, regardless of their values. Typically, it takes 2 cycles to do this type of quantization. Accordingly, in total it takes 128 cycles to finish quantization for an 8×8 block.

Referring to 201 of FIG. 2, the quantization process begins with the computing of coefficients for a discrete cosine transform encoding operation (e.g., coefficient V) and the determination of a quantization step (e.g., Q) for use with the quantization operation. This computation is typically handled by a front-end logic of the video processor.

In step 202, a comparator operation is performed to determine whether the coefficient V is less than ½ of the quantization step (e.g., Q/2). Embodiments of the present invention take advantage of the fact that statistical models show that most of the computed quantized coefficients are small values, and in particular, zeros. In a typical case, most of the quantized values are zeros, for example, in the neighborhood of 54 out of 64. There is no need to use multiplication for those small values. Embodiments of the present invention implement a much faster hardware-based method for computing those small values. The small values can use the accelerated hardware path (e.g., step 202) as opposed to the multiplication path (e.g., step 212), thereby significantly accelerating the overall quantization process. Determining the quantized output value by using the comparator path (e.g., the comparator branch) is much faster than determining the quantized output value by using the multiplication path (e.g., the multiplication branch). In the present embodiment, the accelerated hardware path and the multiplication path both execute in parallel. In other words, for each coefficient, the coefficient is operated on by the comparator path at step 202 and multiplication path at step 212 simultaneously.

In step 202, if the coefficient V is less than ½ the quantization step, Q/2, the quantization value V is set to zero at step 203 and is passed by a multiplexer in step 204 to be transmitted as an output at step 205 to subsequent stages of the encoding process. In step 202, if the coefficient V is not less than or equal to Q/2, the comparator process sends an appropriate control signal to the multiplexer at step 204 that causes the output of the multiplication path (e.g., which is executing in parallel) to be transmitted as the output in step 205.

At step 212, the multiplication path (e.g., multiplication logic) pre-calculates the inverse value (InvQ) of quantization step Q with certain number of bits of precision P. At step 213, a multiplication of InvQ and coefficient (V) is applied, and at step 214, with an addition and shifting, the final quantized value (QuantizedV) is derived. At step 204, the computed quantized value is provided to the multiplexer and provided to the output at step 205 in accordance with the control signal from the comparator process (e.g., step 202). In this manner, embodiments of the present invention use statistics of quantized coefficients to accelerate the quantization calculations.

Figure 3:
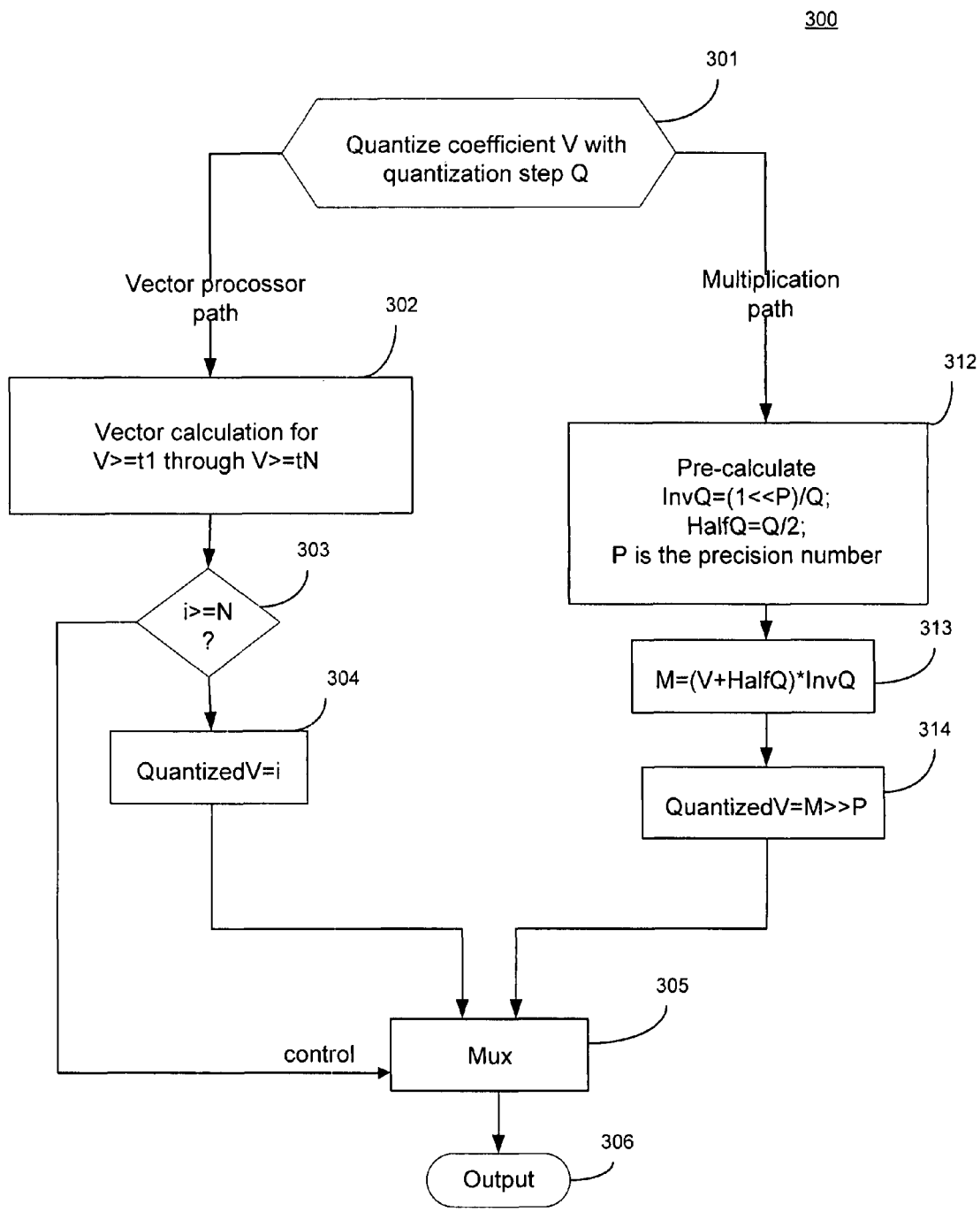
FIG. 3 shows a diagram of a flow chart of a vector processor based quantization acceleration process 300 in accordance with one embodiment of the present invention.

FIG. 3 shows a diagram of a flow chart of a vector processor based quantization acceleration process 300 in accordance with one embodiment of the present invention. As depicted in FIG. 3, process 300 shows the general operating steps of a vector processor quantization process that implements both a vector processor path and a multiplication path as shown.

The vector processor based quantization acceleration process 300 of FIG. 3 utilizes a vector processor to compute a larger number of quantization values in parallel.

Referring to 301 of FIG. 3, the quantization process begins with the computing of coefficients (e.g., coefficient V) and the determination of a quantization step (e.g., Q). In step 302, out of a range of possible quantized output values, a vector processor computes a set of quantized output values from the coefficients by evaluating each of the quantized output values of the set in parallel.

For example, in where N comparators are used, the thresholds of comparators are t1, t2 ... tN, where:

$$ti=(i-1)*Q+Q/2, i=1,2 \ldots N,$$

Q is the quantization step. In one embodiment, the thresholds are pre-calculated. In the present embodiment, the output of each comparator is 1 when V>=ti, and 0 otherwise. The sum "i" of comparators' outputs indicates whether quantized value can be determined by comparator outputs or by multiplication approach. More specifically, at step 303, when i<N, the quantized value is the sum, at step 304. When i>=N, the quantized value is derived through multiplication approach, via the control signal in step 305 and 306.

For the range of possible quantized output values that are not computed using the vector processor, the quantized output values are computed from the coefficients by executing multiplication logic and transmitting the resulting quantized output values to the encoding process. Thus, at step 312, the multiplication path pre-calculates the inverse value (InvQ) of quantization step Q with a certain number of bits of precision P. At step 313, a multiplication of InvQ and coefficient (V) is applied, and at step 314, with an addition and shifting, the final quantized value (QuantizedV) is derived. At step 304 and at step 314, the computed quantized value is provided to the multiplexer and provided to the output at step 305 in accordance with the control signal from the vector processor (e.g., step 303). In this manner, the vector processor embodiments of the present invention use statistics of a number of quantized coefficients to accelerate the quantization calculations.

Figure 4:
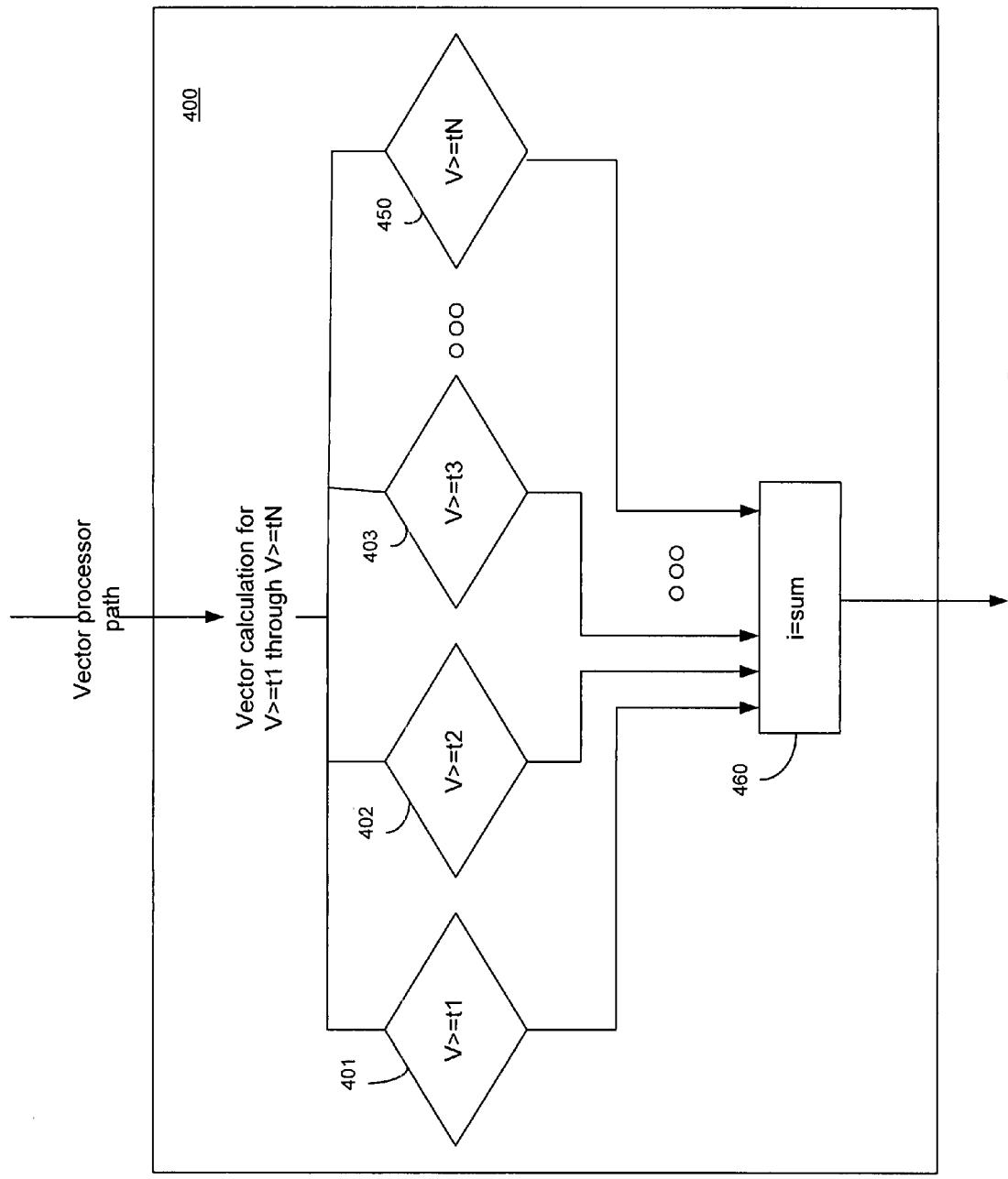
FIG. 4 shows a diagram illustrating the internal components of a vector processor 400 in accordance with one embodiment of the present invention.

FIG. 4 shows a diagram illustrating the internal components of a vector processor 400 in accordance with one embodiment of the present invention. As depicted in FIG. 4, the vector processor 400 includes a plurality of comparators 401-450 coupled to a summation unit 460.

The vector processor 400 receives incoming coefficients from the vector processor path as shown. An incoming coefficient is coupled to each of the comparators 401-450 where it is evaluated in parallel. It should be noted that FIG. 4 shows a variable number of comparators N (e.g., 401-450). The variable number of comparators can be used in parallel to specifically tailor the degree of hardware acceleration. The variable N depends on the specific requirements of a given application and statistical model. For example, for typical JPEG encoding, N=1 is often good enough. But for those cases where high quality encoding is particularly desirable, N=2 or more is often a better choice. For H.264, N=2 or more is also a good choice. The performance of the vector processor can be further increased by including a larger number of comparators to increase the size of the set of quantized output values out of the range of possible quantized output values that the comparators can compute in parallel. As described above, the sum "i" of the comparator outputs indicates whether the quantized value can be determined by the comparator outputs (e.g., of the vector processor 400) or by the multiplication approach (e.g., the multiplication path of FIG. 3).

Referring still to the vector processor 400 embodiment of FIG. 4, the inclusion of a large number of comparators provides an ability to selectively include either all of the comparators, or some number less than all of comparators, into a finalized fabricated vector processor (e.g., vector processor ASIC, etc.). For example, as described above, the computational power of the vector processor path can be increased by incorporating a larger number of comparators to compute a correspondingly larger number of quantized output values in parallel. Similarly, the computational power of the vector processor can be decreased, along with the corresponding power consumption and silicon die space utilization, by incorporating a fewer number of comparators. This capability enables selective incorporation of comparators in accordance with other factors, such as, for example, circuit test indications that indicate a pass/fail status for each comparator.

In a selective incorporation embodiment, circuit test patterns, or the like, can be executed on the prospective video processor ASIC to determine whether all of the included comparators are fully functional or whether one or more of them are defective. Those of the comparator units that are defective can be isolated from the overall circuit in order to leave the fully functional comparators behind and integrated with the overall circuit. Thus, flaws in one or more of the comparators need not ruin the functionality of the entire overall integrated circuit. The flawed comparators are simply isolated or deactivated, thereby reducing the overall number of comparators in the vector processor without compromising the function of the vector processor. This attribute effectively increases the yield of a fabrication process for producing the video processor ASIC. For example, those video processor ASICs which otherwise would be tested out as "bad" and discarded can still be utilized.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for vector processing based quantization acceleration for an encoding process, comprising:
   computing coefficients for a discrete cosine transform encoding operation;
   determining a quantization step for use with a quantization operation for each of the coefficients;
   out of a range of possible quantized output values, computing a set of quantized output values from the coefficients by using a vector processor configured to evaluate each of the quantized output values of the set in parallel, wherein the vector processor comprises a plurality of comparators configured to determine a respective one quantized output value of the set of output values and configured to operate in parallel to compute a resulting quantized output value from the coefficients;
   for the range of possible quantized output values that are not computed using the vector processor, computing the quantized output values from the coefficients by executing multiplication logic; and
   transmitting the resulting quantized output values to the encoding process.

2. The method of claim 1, wherein determining the quantized output value by using the vector processor comprises a vector processing branch of the encoding process and wherein determining the quantized output value by using the multiplication logic comprises a multiplier branch of the encoding process, the vector processing branch executing faster than a multiplier branch to implement the quantization acceleration for the encoding process.

3. The method of claim 1, wherein performance of the vector processor can be increased by including a larger number of comparators to increase the size of the set of quantized output values out of the range of possible quantized output values that the comparators can operate in parallel to compute.

4. The method of claim 2, wherein the vector processor branch and the multiplier branch execute in parallel.

5. The method of claim 1, wherein the encoding process comprises a JPEG encoding process.

6. The method of claim 1, wherein the encoding process comprises an MPEG encoding process.

7. The method of claim 1, wherein the encoding process is implemented by a video processor embedded within a GPU of a computer system.

8. The method of claim 1, wherein the vector processor is configured for selective incorporation of comparators to isolate a defective comparator from the vector processor.

9. A video processor for vector processor quantization acceleration for an encoding process, comprising:
   front-end logic for computing coefficients for a discrete cosine transform encoding operation and determining a quantization step for use with a quantization operation for each of the coefficients;
   a vector processor coupled to the front-end logic for, out of a range of possible quantized output values, computing a set of quantized output values from the coefficients, wherein the vector processor is configured to evaluate each of the quantized output values of the set in parallel, wherein the vector processor comprises a plurality of comparators configured to determine a respective one quantized output value of the set of output values and configured to operate in parallel to compute a resulting quantized output value from the coefficients;
   multiplication logic coupled to the front-end logic for computing the quantized output values from the coefficients for the range of possible quantized output values that are not computed using the vector processor; and
   an output for transmitting the computed quantized output value from the vector processor or from the multiplication logic to the encoding process.

10. The video processor of claim 9, wherein determining the quantized output value by using the vector processor comprises a vector processing branch of the encoding process and wherein determining the quantized output value by using the multiplication logic comprises a multiplier branch of the encoding process, the vector processing branch executing faster than a multiplier branch to implement the quantization acceleration for the encoding process.

11. The video processor of claim 9, wherein performance of the vector processor can be increased by including a larger number of comparators to increase the size of the set of quantized output values out of the range of possible quantized output values that the comparators can operate in parallel to compute.

12. The video processor of claim 10, wherein the vector processor branch and the multiplier branch execute in parallel.

13. The video processor of claim 9, wherein the encoding process comprises a JPEG encoding process.

14. The video processor of claim 9, wherein the encoding process comprises an MPEG encoding process.

15. A computer system, comprising:
a system memory;
a central processor unit coupled to the system memory;
a graphics processor unit communicatively coupled to the central processor unit;
a video processor within the graphics processor unit for implementing quantization acceleration for a media encoding process;
front-end logic within the video processor for computing coefficients for a discrete cosine transform encoding operation and determining a quantization step for use with a quantization operation for each of the coefficients;
a vector processor coupled to the front-end logic for, out of a range of possible quantized output values, computing a set of quantized output values from the coefficients, wherein the vector processor is configured to evaluate each of the quantized output values of the set in parallel, wherein the vector processor comprises a plurality of comparators configured to determine a respective one quantized output value of the set of output values and configured to operate in parallel to compute a resulting quantized output value from the coefficients;
multiplication logic coupled to the front-end logic for computing the quantized output values from the coefficients for the range of possible quantized output values that are not computed using the vector processor; and
an output for transmitting the computed quantized output value from the vector processor or from the multiplication logic to the encoding process.

16. The computer system of claim 15, wherein determining the quantized output value by using the vector processor comprises a vector processing branch of the encoding process and wherein determining the quantized output value by using the multiplication logic comprises a multiplier branch of the encoding process, the vector processing branch executing faster than a multiplier branch to implement the quantization acceleration for the encoding process.

17. The computer system of claim 16, wherein the vector processor branch and the multiplier branch execute in parallel.

* * * * *